United States Patent
Okabe et al.

(10) Patent No.: US 10,099,183 B2
(45) Date of Patent: Oct. 16, 2018

(54) SOLVENT-RESISTANT SEPARATION MEMBRANE

(71) Applicant: TORAY INDUSTRIES, INC., Tokyo (JP)

(72) Inventors: Jun Okabe, Otsu (JP); Masahiro Kimura, Otsu (JP); Koji Nakatsuji, Otsu (JP); Tsuyoshi Hamada, Otsu (JP); Ryoma Miyamoto, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/502,414

(22) PCT Filed: Aug. 7, 2015

(86) PCT No.: PCT/JP2015/072587
§ 371 (c)(1),
(2) Date: Feb. 7, 2017

(87) PCT Pub. No.: WO2016/021731
PCT Pub. Date: Feb. 11, 2016

(65) Prior Publication Data
US 2017/0216781 A1    Aug. 3, 2017

(30) Foreign Application Priority Data

Aug. 8, 2014 (JP) ................. 2014-162142
Aug. 29, 2014 (JP) ................. 2014-175395

(51) Int. Cl.
| | | |
|---|---|---|
| *B01D 69/12* | (2006.01) |
| *B01D 69/10* | (2006.01) |
| *B01D 71/42* | (2006.01) |
| *B01D 67/00* | (2006.01) |
| *B01D 69/02* | (2006.01) |
| *B01D 71/66* | (2006.01) |
| *B01D 71/56* | (2006.01) |
| *B01D 71/40* | (2006.01) |

(52) U.S. Cl.
CPC ......... *B01D 69/12* (2013.01); *B01D 67/0083* (2013.01); *B01D 69/02* (2013.01); *B01D 69/10* (2013.01); *B01D 69/125* (2013.01); *B01D 71/42* (2013.01); *B01D 71/56* (2013.01); *B01D 71/66* (2013.01); *B01D 67/0016* (2013.01); *B01D 67/0095* (2013.01); *B01D 71/40* (2013.01); *B01D 2323/08* (2013.01); *B01D 2323/30* (2013.01); *B01D 2325/24* (2013.01); *B01D 2325/30* (2013.01)

(58) Field of Classification Search
CPC ........... B01D 2323/08; B01D 2323/30; B01D 2325/24; B01D 2325/30; B01D 67/0016; B01D 67/0083; B01D 67/0095; B01D 69/02; B01D 69/10; B01D 69/12; B01D 69/125; B01D 71/40; B01D 71/42; B01D 71/56; B01D 71/66
See application file for complete search history.

(56) References Cited

U.S. PATENT DOCUMENTS

| | | | |
|---|---|---|---|
| 3,887,747 A | 6/1975 | Tamura | |
| 4,434,206 A | 2/1984 | Fukuda | |
| 5,032,282 A * | 7/1991 | Linder | ............... B01D 67/0093 210/490 |
| 7,891,499 B2 | 2/2011 | Ichikawa | |
| 2006/0249447 A1* | 11/2006 | Yeager | ............... B01D 67/0011 210/506 |
| 2009/0242478 A1 | 10/2009 | Ichikawa | |

FOREIGN PATENT DOCUMENTS

| | | |
|---|---|---|
| EP | 0430160 A2 * | 6/1991 |
| JP | 515090 | 2/1976 |
| JP | 57166354 | 10/1982 |
| JP | 6335406 | 7/1988 |
| JP | 02221404 | 9/1990 |
| JP | 0500088 | 1/1993 |
| JP | 2722577 | 3/1998 |
| JP | 2814505 | 10/1998 |
| JP | 2924202 | 7/1999 |
| JP | 2002306936 | 10/2002 |
| JP | 2009240902 | 10/2009 |
| JP | 2010510870 | 4/2010 |
| JP | 2013177273 | 9/2013 |

OTHER PUBLICATIONS

International Search Report and Written Opinion for International Application No. PCT/JP2015/072587, dated Nov. 2, 2015, 5 pages.
Extended European Search Report for European Application No. 15829475.1, dated Sep. 11, 2917, 8 pages.

\* cited by examiner

*Primary Examiner* — John Kim
(74) *Attorney, Agent, or Firm* — RatnerPrestia

(57) ABSTRACT

The present invention provides a separation membrane that is usable at a high temperature and a high pressure. The solvent-resistant separation membrane of the present invention has an average pore diameter of the separation membrane surface of 0.005 to 1 μm and includes a portion where a degree of cyclization ($I_{1600}/I_{2240}$) as measured by the total reflection infrared absorption spectroscopy is 0.5 to 50.

6 Claims, No Drawings

SOLVENT-RESISTANT SEPARATION MEMBRANE

CROSS REFERENCE TO RELATED APPLICATIONS

This is the U.S. National Phase application of PCT International Application No. PCT/JP2015/072587, filed Aug. 7, 2015, which claims priority to Japanese Patent Application No. 2014-162142, filed Aug. 8, 2014, and Japanese Patent Application No. 2014-175395, filed Aug. 29, 2014, the disclosures of each of these applications being incorporated herein by reference in their entireties for all purposes.

FIELD OF THE INVENTION

The present invention relates to a solvent-resistant separation membrane that is useful for selective separation of a liquid mixture. The separation membrane obtained by the present invention can be suitably used for selective separation of a liquid mixture containing an organic solvent.

BACKGROUND OF THE INVENTION

A separation membrane technology is utilized in various fields inclusive of a water treatment field such as drinkable water production, water purification treatment and wastewater treatment, a food industry field, and so on. For example, in the water treatment field such as drinkable water production, water purification treatment and wastewater treatment, separation membranes have been used for the purpose of removal of impurities in water as alternatives to conventional sand filtration and coagulating sedimentation processes. In the waste water treatment field, an activated sludge membrane filtration treatment process using a separation membrane for the separation of a flocculated sludge and water from each other from a microbial consortium called an activated sludge is widely adopted. In addition, in the food industry field, a separation membrane is used aiming at separation and removal of yeast used for fermentation or concentration of a treatment stock solution.

Recent progress of technologies in various fields including chemical industry is notable, and the separation membranes are required to have much more improvements in corrosion resistance, such as endurance against a high temperature and a high pressure, separation of a liquid mixture containing an organic solvent, an acid, or an alkali, etc.

Heretofore, as separation membranes coping with the above-described liquid mixture, sintered metal filters or ceramic filters having high specific strength at a high temperature, materials based on carbon fibers, and the like have been generally used.

However, in the case of sintered metal filters, there is a concern that the constituent metals are eluted, and there is a case where the acid resistance is insufficient. In addition, in the case of ceramic filters, though the acid resistance is sufficient, there is a concern that particles are eluted, and in particular, there is a case where Si accumulates, thereby clogging the filter, the piping, or the like. Furthermore, the ceramic filters involved such a problem that the filtration efficiency is low because handling is difficult, whereby modulation thereof is difficult.

Meanwhile, a composite separation filter described in Patent Document 1 has excellent characteristic features, such as endurance against a high temperature, good corrosion resistance, etc., in view of the matter that it has carbon fibers as a substrate. In addition, Patent Documents 2 and 3 disclose hollow carbon membranes. Patent Documents 4 and 5 disclose flat membrane type carbon membranes.

PATENT DOCUMENT

Patent Document 1: JP-A-57-166354
Patent Document 2: JP-B-51-5090
Patent Document 3: JP-B-5-00088
Patent Document 4: JP-T-2010-510870
Patent Document 5: JP-A-2013-177273

SUMMARY OF THE INVENTION

As described above, the separation membranes are required to have more improvements in performances aiming at use at a high temperature and a high pressure. The composite separation filter of Patent Document 1 is one to be used as an alternative material to a filter paper and only has a separation performance to an extent that a solid and a liquid are separated from each other.

As for the hollow carbon membranes of Patent Documents 2 and 3, in view of the fact that voids are present in the interior of the structure, there is a concern that the strength, pressure-resistant performance and shape stability originally possessed by the carbon fibers are insufficient.

The carbon membranes of Patent Documents 4 and 5 are high in rigidity but low in toughness because a support thereof is made of an inorganic material such as alumina. Therefore, it is difficult to process such a carbon membrane into a module capable of accommodating a membrane having a large area within a small volume, as in a spiral type separation membrane element. Namely, as a result, there is encountered such a problem that the module provided with such a carbon membrane is small in a membrane area per unit volume, and hence, a fluid permeation amount is small.

Accordingly, an object of the present invention is to provide a solvent-resistant separation membrane that is suitable for selective separation of a liquid mixture containing an organic solvent.

In order to solve the above-mentioned problem, a separation membrane of an embodiment of the present invention is a solvent-resistant separation membrane including a porous layer, in which an average pore diameter of at least one surface of the porous layer is 0.005 to 1 μm, and the porous layer includes a portion where a degree of cyclization ($I_{1600}/I_{2240}$) as measured by a total reflection infrared absorption spectroscopy is 0.5 to 50.

In accordance with the present invention, a separation membrane with excellent solvent resistance, which is not only endurable against a high temperature and a high pressure but also applicable to an organic solvent, can be obtained.

DETAILED DESCRIPTION OF EMBODIMENTS OF THE INVENTION (1) Solvent-Resistant Separation Membrane The solvent-resistant separation membrane as described below (hereinafter sometimes referred to simply as "separation membrane") is sufficient as long as it includes at least a porous layer. Namely, the separation membrane may be constituted of only a porous layer or may have other constituent elements. Examples of other constituent elements include a substrate and a separation functional layer. The separation membrane may also include other layers than the substrate and the separation functional layer.

The form of the separation member may be any of a flat membrane, a tubular membrane, a hollow fiber membrane, and so on.

(2) Porous Layer

The porous layer is preferably a layer including a three-dimensional network structure in which an average pore diameter (diameter) in a cross section of the membrane in a thickness direction is 10 nm or more.

An average pore diameter in at least one surface of two surfaces of the porous layer is 0.005 to 1 µm. In addition, the average pore diameter of this surface is preferably 0.05 µm or more, more preferably 0.07 µm or more, and still more preferably 0.08 µm or more. In addition, the average pore diameter thereof is preferably 0.5 µm or less, more preferably 0.3 µm or less, still more preferably 0.2 µm or less, and especially preferably 0.1 µm or less.

When the average pore diameter of the at least one surface of the porous layer is 0.005 µm or more, a sufficient solute permeation performance can be obtained. In addition, when the average pore diameter of the at least one surface of the porous layer is 1 µm or less, a performance of removing a solid and the like contained in the solute is realized. Such an average pore diameter can be obtained by forming a three-dimensional network structure with a polymer serving as a precursor and then performing a heat treatment under a flameproofing condition as described later. In addition, at least in the porous layer, it is preferred that the average pore diameter satisfies this range in a surface at the side where water flows in (i.e., surface at the opposite side to a substrate as described later).

The average pore diameter of the surface and the cross section of the porous layer is determined by averaging pore diameter values obtained through observation with a scanning electron microscope. On that occasion, though the magnification can be properly chosen according to the size of fine pores of the obtained membrane, in general, it is preferred that magnification is about 300,000 to 1,000,000.

It is preferred that the porous layer contains, as a main component thereof, a flameproofed polymer that is a polyacrylonitrile-based polymer having been subjected to a flameproofing treatment. When subjected to a flameproofing treatment, the porous layer is able to acquire heat resistance and pressure resistance as well as sufficient solvent resistance.

Additionally, the terms "X contains Y as a main component" as referred to in the present specification refer to the case where a proportion of Y occupying in X is 60% by weight or more, 80% by weight or more, or 90% by weight or more, or X is composed of only Y.

The porous layer includes a portion where a degree of cyclization ($I_{1600}/I_{2240}$) as measured by the total reflection infrared absorption spectroscopy is 0.5 to 50. The porous layer preferably includes a portion where the degree of cyclization is 1 to 20 and more preferably includes a portion where the degree of cyclization is 3 to 15.

The degree of cyclization ($I_{1600}/I_{2240}$) refers to a value that is adopted as an index of the flameproofing reaction of a polyacrylonitrile-based polymer. As defined by the following equation (1), the degree of cyclization is a ratio of an absorption peak value corresponding to a nitrile group and an absorption peak value corresponding to a naphthyridine ring, and it is indicated that as this value is larger, the portion of the nitrile group becomes smaller, so that the cyclization proceeds.

$$\text{Degree of cyclization} = I_{1600}/I_{2240} \tag{1}$$

$I_{1600}$: Absorption peak value corresponding to the naphthyridine ring at 1,600 cm$^{-1}$ $I_{2240}$: Absorption peak value corresponding to the nitrile group at 2,240 cm$^{-1}$ The measurement of the degree of cyclization can be performed as follows. First of all, the membrane to be measured is thoroughly dried. Subsequently, a surface of the membrane (namely, a surface of the porous layer) is irradiated with infrared rays to detect a reflected light, thereby obtaining a spectrum. A more preferred measurement method is described in the Examples. Specifically, the degree of cyclization described in the present specification is a value that is measured by the method described in the Examples.

In the case where the porous layer exhibits a degree of cyclization of 0.5 or more, the polyacrylonitrile-based polymer is thoroughly cyclized, and as a result, the separation membrane exhibits high durability against a solvent. In addition, when the porous layer has a degree of cyclization of 50 or less, the separation membrane has appropriate toughness and is able to inhibit clogging of pores at the time of flameproofing.

It is preferred that the porous layer has a gradient of the degree of cyclization in a thickness direction of the porous layer.

The terms "having a gradient" as referred to in the present specification mean that the degree of cyclization is different at arbitrary two points in the thickness direction. Therefore, for example, the case where the porous layer has a degree of cyclization in a part of the region but does not have a degree of cyclization in other regions is also included in the state of "having a gradient".

It is preferred that the porous layer exhibits a gradient such that the degree of cyclization is higher in one surface of the porous layer, whereas it becomes lower toward the other surface thereof. According to such a constitution, the porous layer has such an advantage that it exhibits high durability against an organic solvent in the surface exhibiting a higher degree of cyclization and a neighborhood thereof, whereas influences that the cyclization gives to properties inherent to a polymer that constitutes the porous layer are a few in the surface exhibiting a lower degree of cyclization and a neighborhood thereof.

Specifically, a portion exhibiting a lower degree of cyclization is high in flexibility. For example, in the case where the porous layer is supported by the substrate, in the porous layer, the surface having a lower degree of cyclization is preferred because it has high adhesiveness to the substrate, and as compared with the surface having a higher degree of cyclization, the surface having a lower degree of cyclization is excellent in flexibility. Therefore, in undergoing modulation, good moldability is exhibited.

In addition, the degree of cyclization may have such a gradient that the degree of cyclization is higher on the both surfaces of the above-described porous layer (such both surfaces can also be called the surface layers, which are ends in the thickness direction) and becomes lower toward the central part thereof. According to such a constitution, it becomes possible to realize a membrane in which, in the porous layer, not only the both surfaces having a higher degree of cyclization have high chemical resistance (dimensional stability) in view of the fact that the both surfaces exhibit a higher degree of cyclization, but also the central part has sufficient moldability (flexibility) in view of the fact that the central part has a lower degree of cyclization.

The degree of cyclization on at least one surface of the porous layer is preferably 0.5 or more, more preferably 0.8 or more, still more preferably 1.0 or more, and especially preferably 2.0 or more. In addition, the degree of cyclization of this surface is preferably 50 or less, more preferably 20 or less, still more preferably 15 or less, yet still more preferably 10 or less, and especially preferably 3.0 or less. The degree of cyclization of the other surface may be lower than this. In particular, in the surface (surface at the front side) having an average pore diameter of 0.005 to 1 µm, the degree of cyclization is preferably 0.5 to 50. In addition, it is preferred that the degree of cyclization in this surface at the front side is relatively higher than the degree of cyclization in other portions of the porous layer. For example, it is preferred that the degree of cyclization in the surface at the front side is 0.8 to 3.0, whereas the degree of cyclization in the surface at the opposite side (surface at the back side) is 0.5 to 2.0.

In addition, it is preferred that the porous layer has a region where the gradient of the degree of cyclization in the thickness direction of the porous layer is gentle and a region where the gradient of the degree of cyclization in the thickness direction of the porous layer is steep. In particular, it is preferred that the gradient is gentle in a portion where the degree of cyclization is higher, and a portion where the gradient is steep is present between a portion having a higher degree of cyclization and a portion having a lower degree of cyclization.

According to such a constitution, in the region where the degree of cyclization is higher and the gradient is gentle, the sufficient solvent resistance is held at the membrane surface side, and furthermore, in the region where the gradient is steep, an interval between the region having a higher degree of cyclization to the region having a lower degree of cyclization is continuously connected, whereby stress concentration into a specified interface within the layer can be prevented from occurring. Thus, reliability can be enhanced while revealing desired solvent resistance.

The region where the gradient of the degree of cyclization is gentle refers to a region where the gradient of the degree of cyclization is continued with a relatively small value. In addition, the region where the gradient of the degree of cyclization is steep refers to a region where the gradient of degree of cyclization is continued with a relatively large value. The region where the gradient is gentle and the region where the gradient is steep are macroscopically distinguished from each other. Additionally, a region where the gradient of the degree of cyclization is constant is included in the region where the gradient of the degree of cyclization is gentle.

Examples of the region where the gradient of the degree of cyclization is gentle include a region where the flameproofing reaction proceeds, so that the degree of cyclization is higher; and a region where the flameproofing does not proceed, so that the structure does not change from the polymer serving as a precursor. In addition, examples of the region where the gradient of the degree of cyclization is steep include a region where the gradient transits from the region having a higher degree of cyclization to the region having a lower degree of cyclization (namely, a region having properties close to original properties of the precursor).

In the porous layer, a ratio of the degree of cyclization of the region having a higher degree of cyclization to the region having a lower degree of cyclization is preferably 1.1 or more, more preferably 1.3 or more, and still more preferably 1.5 or more. When the degree of cyclization falls within the above-described range, it is possible to make both the solvent resistance and the flexibility of the separation membrane compatible with each other. In the porous layer, in the case where the degree of cyclization in one surface is higher than the degree of cyclization in the other surface, it is also preferred that a ratio of the degree of cyclization of the one surface to the degree of cyclization of the other surface falls within the same numerical value range. Additionally, in the case of exhibiting a gradient such that the degree of cyclization is higher in one surface of the porous layer and becomes lower toward the other surface, specifically, the ratio of the degree of cyclization of the region having a higher degree of cyclization to the region having a lower degree of cyclization refers to a ratio of the degree of cyclization in the one surface of the porous layer to the degree of cyclization in the other surface of the porous layer.

A thickness of the region having a higher degree of cyclization in the surface of the porous layer is typically in a range of from 0.5 µm to 8 µm, and in particular, it is preferably in a range of from 1 µm to 4 µm. In the case where the thickness is smaller than the above-described range, the sufficient solvent resistance cannot be obtained, whereas in the case where the thickness is increased more than the above-described range, the flexibility of the separation membrane tends to be worsened.

In addition, it is preferred that the gradient of the degree of cyclization changes continuously along the thickness direction of the porous layer. As compared with the case where the degree of cyclization changes discontinuously, in the case where the degree of cyclization changes continuously, the stress concentration into an interface existent in the interior of the separation membrane becomes hard to occur, the peel strength becomes strong, and the heat resistance and pressure resistance (membrane evaluation under a high-temperature condition, or pressure resistance at the time of repetitive operation of pressure rise and pressure drop), and so on are improved.

The above-described "interface" refers to an interface between or among two or more portions having a different composition from each other when the porous layer contains those portions; an interface between or among two or more portions having a different composition (other than the degree of cyclization) from each other when the porous layer contains those portions; an interface between the substrate and the porous layer; an interface between the porous layer and a separation functional layer; or the like.

Whether or not the gradient of the degree of cyclization in the thickness direction is according to that as in the present embodiment can be judged by performing structural analysis of the separation membrane surface and the membrane cross section. Examples of a method of structural analysis of the membrane cross section include a method of cutting the separation membrane by GSP (gradient shaving preparation) to expose a cross section in the thickness direction and measuring the degree of cyclization of the cross section in the thickness direction by the total reflection infrared absorption spectroscopy.

The gradient of the degree of cyclization of the porous layer is not limited to a pattern in which the gradient changes continuously, but the gradient may change discontinuously, too.

In the porous layer, an elemental composition ratio of nitrogen is preferably 14% to 20%, and more preferably 15% to 18%. More specifically, the elemental composition ratio of nitrogen is 14.5% or more and 16.0% or less. When the elemental composition ratio of nitrogen falls within the above-described range, the porous layer is able to have high solvent resistance while keeping the toughness. In order to allow the elemental composition ratio to fall within the above-described range, the amount of the copolymerization component of the polyacrylonitrile-based polymer may be regulated, or the temperature or time of the flameproofing treatment may be regulated.

The elemental composition ratio of nitrogen is a value that can be measured by the following method and is a ratio of a nitrogen atom to a total number of atoms of carbon, hydrogen, nitrogen, and oxygen, all of which constitute the porous layer. First of all, the separation functional layer of the separation membrane is cut and removed to obtain a porous support having the substrate and the porous layer provided thereon. Subsequently, after thoroughly drying this porous body, the substrate is peeled off to prepare a sample of the porous layer. Subsequently, the elemental composition ratio of nitrogen is calculated from the amounts of the respective elements obtained by measuring the amount of a gas generated by the combustion method.

In addition, according to the Rutherford backscattering spectrometry/hydrogen forward scattering spectrometry (RBS/HFS) or the high-frequency glow discharge optical emission spectroscopy (GD-OES), the elemental composition ratio of the porous layer in the separation membrane can be measured directly without removing the separation functional layer.

A thickness of the porous layer is preferably in a range of from 10 to 200 μm, and more preferably in a range of from 20 to 100 μm.

The thickness of the porous layer affects the strength of the separation membrane. In order to obtain sufficient mechanical strength and packing density, the thickness of the porous layer is preferably in a range of from 30 to 300 μm, and more preferably in a range of from 50 to 250 μm.

The constitution of the porous layer is not limited to a constitution composed of a single layer, but the porous layer may also have a constitution of a laminate of plural layers. In the case where the porous layer has a constitution of a laminate of plural layers, layers having the same composition may be laminated, or plural layers having a different composition from each other may be laminated.

More specifically, it is preferred that the porous layer includes a supporting layer and a skin layer formed on a surface of the supporting layer. The supporting layer holds a shape of the skin layer, and the skin layer is provided with fine pores having a small pore diameter, thereby exhibiting a desired separation function.

The skin layer is a layer having an average pore diameter of 0.005 μm or more and 1 μm or less in the cross section of the membrane in the thickness direction, and the supporting layer is a layer having an average pore diameter of larger than 1 μm in the cross section of the membrane in the thickness direction. In addition, the thickness of the supporting layer is preferably in a range of from 10 to 200 μm, and more preferably in a range of from 20 to 100 μm.

Additionally, in the present specification, the thickness of each layer and membrane means an average value unless otherwise indicated. Here, the average value expresses an arithmetic average value. That is, the thickness of each layer and membrane is determined by calculating an average value of thickness at 20 points measured at intervals of 20 μm in a direction (membrane surface direction) orthogonal to the thickness direction in cross-section observation.

As for the solvent-resistant separation membrane, it is preferred that a change ratio R of water permeability before and after allowing it to follow a circular cylinder having a radius of 30 mm is less than 10%. The terms "allowing it to follow" mean that the membrane is wound around the circular cylinder so as to go around the side face of the circular cylinder.

The water permeability is variable with an irreversible shape change. Examples of the irreversible shape change include breakage of the porous layer and exfoliation of the porous layer and the substrate from each other, and besides, a change of pore shape which cannot be observed through visual inspection. By allowing the separation membrane to follow the circular cylinder, the water permeability may increase or may decrease. For example, when the porous layer is broken, the water permeability increases, whereas when the fine pores collapse, the water permeability decreases. Specifically, when the water permeability before allowing the separation membrane to follow the circular cylinder is defined as F1, and the water permeability after allowing the separation membrane to follow the circular cylinder is defined as F2, the change ratio R of water permeability is expressed as a ratio (percentage) to F1 of an absolute value ($|F2-F1|$) that is a difference between F1 and F2. Namely, the change ratio R is expressed by [R (%)={$|F2-F1|/F1$}×100].

In order that the change ratio R of water permeability before and after allowing the separation membrane to follow the circular cylinder is controlled to less than 10%, the combination of the porous layer and the substrate may be regulated, or the degree of cyclization of the porous layer may be decreased. On the other hand, in view of the fact that the decrease of the degree of cyclization worsens the solvent resistance of the porous layer, in order to make both the solvent resistance and the followability compatible with each other, it is preferred that the porous layer has the region having a higher degree of cyclization and the region having a lower degree of cyclization. Allowing the elemental composition ratio of nitrogen to fall within the above-described range is also effective for controlling the change ratio R of water permeability because the toughness is improved.

(3) Separation Functional Layer

The separation membrane may further include a separation functional layer provided on the porous layer.

An average pore diameter of a surface of the separation functional layer is smaller than the pore diameter of the surface of the porous layer. The average pore diameter of the surface of the separation functional layer is chosen and determined by a molecular size of the objective organic solvent or properties of the liquid mixture. Specifically, the average pore diameter of the surface of the separation functional layer is preferably 1 nm or less. The average pore diameter of the separation functional layer can be measured by the gas adsorption method. When the separation membrane includes the separation functional layer, it is possible to realize a separation membrane adaptive to selective separation of a small compound such as a low-molecular weight organic solvent.

The separation functional layer is required to have resistance to an organic solvent similar to the porous layer. Examples of the separation functional layer having resistance to an organic solvent include a separation functional layer containing, as a main component, a polyamide.

The separation functional layer containing, as a main component, a polyamide can be formed through interfacial polycondensation between a polyfunctional amine and a polyfunctional acid halide on the porous supporting layer. Here, it is preferred that at least one trifunctional or higher functional compound is used as at least one of the polyfunctional amine and the polyfunctional acid halide.

Here, the polyfunctional amine refers to an amine having at least two primary amino groups and/or secondary amino groups in one molecule thereof, in which at least one of the amino groups is a primary amino group.

Examples of the polyfunctional amine include aromatic polyfunctional amines in which two amino groups are bound to a benzene ring in a positional relation at any of an ortho position, a meta position, and a para position, such as phenylenediamine, xylylenediamine, 1,3,5-triaminobenzene, 1,2,4-triaminobenzene, 3,5-diaminobenzoic acid, 3-aminobenzylamine, and 4-aminobenzylamine; aliphatic polyfunctional amines such as ethylenediamine, and propylenediamine; alicyclic polyfunctional amines such as 1,2-diaminocyclohexane, 1,4-diaminocyclohexane, 4-aminopiperidine, and 4-aminoethylpiperazine.

Taking into consideration the selective separability, permeability, and heat resistance of the membrane, the polyfunctional amine is preferably an aromatic polyfunctional amine having two to four primary amino groups and/or secondary amino groups in one molecule thereof. As such a polyfunctional aromatic amine, m-phenylenediamine, p-phenylenediamine, or 1,3,5-triaminobenzene is suitably used. Above all, m-phenylenediamine (hereinafter referred to as "m-PDA") is more preferred in view of easiness of availability or easiness of handling.

The polyfunctional amine may be used solely, or a combination of two or more polyfunctional amines may also be used. In the case where two or more polyfunctional amines are used, the above-exemplified amines may be combined with each other, or the above-described amine may be combined with an amine having at least two secondary amino groups in one molecule thereof. Examples of the amine having at least two secondary amino groups in one molecule thereof may include piperazine, and 1,3-bispiperidylpropane.

The polyfunctional acid halide refers to an acid halide having at least two halogenated carbonyl groups in one molecule thereof.

Examples of a trifunctional acid halide include trimesic acid chloride, 1,3,5-cyclohexanetricarboxylic acid trichloride, and 1,2,4-cyclobutanetricarboxylic acid trichloride.

Examples of a bifunctional acid halide include aromatic bifunctional acid halides such as biphenyldicarboxylic acid dichloride, azobenzenedicarboxylic acid dichloride, terephthalic acid chloride, isophthalic acid chloride, and naphthalenedicarboxylic acid chloride; aliphatic bifunctional acid halides such as adipoyl chloride, and sebacoyl chloride; and alicyclic bifunctional acid halides such as cyclopentanedicarboxylic acid dichloride, cyclohexanedicarboxylic acid dichloride, and tetrahydrofuranedicarboxylic acid dichloride.

Taking into consideration the reactivity with the polyfunctional amine, the polyfunctional acid halide is preferably a polyfunctional acid chloride. In addition, taking into consideration the selective separability and heat resistance of the membrane, the polyfunctional acid halide is preferably a polyfunctional aromatic acid chloride having two to four carbonyl chloride groups in one molecule thereof. In particular, from the viewpoint of easiness of availability or easiness of handling, trimeric acid chloride is more preferred. These polyfunctional acid halides may be used solely or may be used in combination of two or more thereof at the same time.

From the viewpoint of physical durability, it is preferred that the separation functional layer firmly adheres to the porous layer. From the above-described viewpoint, the separation functional layer is preferably a material having a high carbon ratio similar to the porous layer. It is preferred that the separation functional layer contains, as a main component, at least one carbon material selected from carbon nanotube, graphene, graphene oxide, diamond-like carbon and amorphous carbon, or is made of only a carbon material.

The carbon material is suitable as the material of the separation functional layer because in addition to the high solvent resistance, the resistance to a high temperature and a high pressure is high. In the light of the above, by combining the above-described porous layer with the separation functional layer containing a carbon material, the separation selectivity can be improved without impairing the solvent resistance of the porous layer.

An elemental composition ratio of carbon of the carbon material is preferably 80% or more, more preferably 85% or more, and still more preferably 90% or more. The elemental composition is a value expressing the kind and constitutional ratio of elements that constitute a substance, and the elemental composition ratio of carbon expresses a proportion at which the carbon atom is contained among all of elements contained in the substance. When the elemental composition ratio of carbon is 80% or more, the separation functional layer having good solvent resistance and high resistance to a high temperature and a high pressure is realized.

Additionally, when it is contemplated to constitute the membrane with only the separation functional layer made of a carbon material, in order to bring about strength, it is necessary to make the thickness of the membrane thick, a permeation flow rate becomes small, and there is encountered such a problem that the membrane is brittle.

By controlling the degree of cyclization of the porous layer so as to fall within the above-described range, the compatibility with the separation functional layer containing a carbon material and the flexibility become high, and in undergoing modulation and at the time of operation, exfoliation of the separation functional layer can be inhibited.

In addition, a thickness of the separation functional layer is preferably in a range of from 5 nm to 1 μm, and more preferably in a range of from 10 nm to 500 nm.

(4) Substrate

It is preferred that the separation membrane includes a substrate. When the separation membrane includes the substrate, sufficient durability endurable against the use under a high pressure is obtained. In the case where the separation membrane includes the substrate, in the separation membrane, it is preferred that the substrate, the porous layer, and the separation functional layer are superimposed in this order. In addition, the production of the separation membrane as described later is accompanied by a treatment step at a high temperature. In this regard, when the separation membrane includes the substrate, the membrane shrinkage can be inhibited. Additionally, even in the case where the separation membrane does not include the substrate, by inhibiting the membrane shrinkage by drawing or the like, a flow channel in the membrane can be ensured.

Examples of the substrate that constitutes the separation membrane include polyethylene, polypropylene, nylon, vinyl chloride homopolymer and copolymers, polystyrene, polyesters such as polyethylene terephthalate, polyvinylidene fluoride, polytetrafluoroethylene, polysulfones, polyethersulfones, polyetherketones, polyphenylene oxide, polyphenylene sulfide, glass fibers, carbon fibers, graphite, and inorganic substrates containing alumina and/or silica as a base.

Above all, from the viewpoints of stability against an acid, against an alkali, or against an organic solvent and inhibition of the membrane shrinkage at the time of treatment step at a high temperature, polytetrafluoroethylene, polyphenylene sulfide, and carbon fibers are preferred. From the viewpoints of processability of the fibers, costs, and adhesiveness to the porous layer, polyphenylene sulfide is especially preferred.

The polytetrafluoroethylene-based resin is, for example, a tetrafluoroethylene homopolymer or a copolymer containing, as a main component, tetrafluoroethylene, such as a tetrafluoroethylene-perfluoroalkyl vinyl ether copolymer, a tetrafluoroethylene-hexafluoropropylene copolymer, a tetrafluoroethylene-ethylene copolymer, etc., singly or a mixture thereof.

The polyphenylene sulfide resin is, for example, a resin containing poly-p-phenylene sulfide, represented by Japanese Patent No. 2924202, Japanese Patent No. 2814505, JP-B-63-35406, Japanese Patent No. 2722577, and so on, and preferably a resin containing 70 mol % or more of poly-p-phenylene sulfide.

When a content of the poly-p-phenylene sulfide in the polyphenylene sulfide resin is less than 70 mol %, various properties such as heat resistance, dimensional stability, and mechanical properties tend to be worsened. The polyphenylene sulfide resin may also be one obtained by copolymerizing or mixing a poly-m-phenylene sulfide polymer with a small amount, for example, within a range of less than 30 mol %, of other monomer having an aryl group, a biphenyl group, a terphenyl group, a vinylene group, a carbonate group, or the like in an arbitrary form.

The carbon fibers mean fibrous carbon, and from the standpoint of durability of the fibers, those made of, as a raw material, acrylic fibers, pitch-based fibers, rayon fibers, or phenol fibers are preferred, those made of acrylic fibers, rayon fibers, or phenol fibers are more preferred, and those made of acrylic fibers are especially preferred.

A nonwoven fabric made of carbon fibers is obtained through carbonization of a nonwoven fabric of acrylic flameproofed fibers resulting from flameproofing acrylic fibers or nonwoven fabric production of carbon fibers. It is difficult to subject the carbon fibers to nonwoven fabric production by a dry method, and even in the case of subjecting the carbon fibers to nonwoven fabric production by a wet method, it is difficult to entangle the carbon fibers, and a binder for bonding the carbon fibers becomes necessary. In consequence, a carbon fiber nonwoven fabric obtained through carbonization of a nonwoven fabric of acrylic flameproofed fibers is preferred.

A unit weight of the substrate is 50 to 150 g/m$^2$, preferably 60 to 110 g/m$^2$, and more preferably 70 to 95 g/m$^2$. When the unit weight of the substrate is 150 g/m$^2$ or less, the thickness of the substrate becomes small, and in applying a pressure, the dimensional change becomes small. In addition, in view of the fact that the unit weight of the substrate is small, the size of a module can also be reduced. In addition, when the unit weight is 50 g/m$^2$ or more, the tensile strength of the substrate becomes large, and high durability can be obtained.

A thickness of the substrate is preferably in a range of from 10 to 250 µm, more preferably in a range of from 20 to 200 µm, and still more preferably in a range of from 30 to 120 µm. When the thickness thereof is 10 µm or more, large strength can be obtained, whereas when the thickness thereof is 250 µm or less, the filtration resistance of the liquid can be controlled small.

As the substrate, a fibrous substrate is preferably used from the standpoints of strength, ability to form asperities, and fluid permeability. Any of a long-fiber nonwoven fabric and a short-fiber nonwoven fabric can be preferably used. In particular, the long-fiber nonwoven fabric is excellent in permeability in flow-casting a polymer solution onto the substrate, and further can inhibit the occurrence of exfoliation of the porous layer and disproportionation of the membrane to be caused due to fluffiness of the substrate or the like and also inhibit the occurrence of a defect such as pinholes.

In addition, when the substrate is made of a long-fiber nonwoven fabric constituted of thermoplastic continuous filaments, the matters occurred when using a short-fiber nonwoven fabric, such as disproportionation at the time of flow-casting a polymer solution to be caused due to fluffiness and the membrane defects, can be inhibited. In addition, when the separation membrane is formed continuously, in view of the fact that a tension is applied in a membrane-forming direction, it is preferred that a long-fiber nonwoven fabric that is more excellent in dimensional stability is used for the substrate.

From the standpoints of formability and strength, in the long-fiber nonwoven fabric, it is preferred that the fibers in the surface layer at the opposite side to the porous layer are more longitudinally oriented than the fibers in the surface layer at the side coming into contact with the porous layer. According to such a structure, by keeping the strength, a high effect of preventing membrane breakage, etc., can be realized, and hence, such is preferred. More specifically, in the above-described long-fiber nonwoven fabric, a degree of fiber orientation in the surface layer at the opposite side to the porous layer is preferably 0° to 25°, and a difference in the degree of fiber orientation from the surface layer at the side coming into contact with the porous layer is preferably 10° to 90°.

In a process of producing a separation membrane and a process of producing an element, a heating step is included. In such a heating step, a phenomenon in which the separation membrane is shrunk due to heating takes place. In particular, this phenomenon is remarkable in a width direction where no tension is applied in the continuous membrane formation. The shrinkage causes a problem in dimensional stability or the like, and therefore, the substrate is preferably one having a low ratio of dimensional change by heat. In the nonwoven fabric, when the difference between the degree of fiber orientation in the surface layer at the opposite side to the porous layer and the degree of fiber orientation in the surface layer at the side coming into contact with the porous layer is 10° to 90°, the change by heat in the width direction can also be inhibited, and hence, such is preferred.

Here, the degree of fiber orientation refers to an index indicating the orientation of the fibers of the nonwoven fabric substrate constituting the separation membrane.

The degree of fiber orientation is an average angle of the fibers constituting the nonwoven fabric substrate when the membrane-forming direction in undergoing the continuous membrane formation is defined as 0°, and the orthogonal direction to the membrane-forming direction, namely the width direction of the nonwoven fabric substrate is defined as 90°. Thus, the degree of fiber orientation that is closer to 0° indicates the longitudinal orientation, and the degree of fiber orientation that is closer to 90° indicates the lateral orientation.

The degree of fiber orientation is determined in the following manner. That is, 10 small sample pieces are randomly collected from the nonwoven fabric. Then, photographs of surfaces of these samples are taken by a scanning electron microscope set at a magnification of 100 to 1,000 times. With respect to 100 fibers obtained by choosing 10 fibers from each sample, angles when the length direction (longitudinal direction or membrane-forming direction) of the nonwoven fabric is defined as 0°, and the width direction (lateral direction) of the nonwoven fabric is defined as 90° are measured, and an average value thereof is determined as the degree of fiber orientation by rounding off to the first decimal place.

(5) Separation Membrane Module

The separation membrane is applicable to a separation membrane module. The separation membrane module includes a case for accommodating the separation membrane, a feeding part for feeding the liquid mixture containing an organic solvent into one face of the separation membrane, and a taking-out part for taking the liquid having passed through the separation membrane out the case. The separation membrane module may also be said in different words as a liquid mixture separation device.

The separation membrane module is classified into a flat plate type, a spiral type, a pleated type, a tubular type, a hollow fiber type, and so on depending upon the form of the separation membrane. The above-described separation membrane is applicable to any of these forms.

(6) Production Method of Separation Membrane

A production method of the above-described separation membrane is specifically described.

(6-1) Formation of Porous Layer

A formation process of the porous layer includes (a) a step of preparing a polyacrylonitrile-based polymer solution, (b) a step of forming a layer having a three-dimensional network structure from the polymer solution, and (c) a flameproofing step.

(a) Step of Preparing a Polyacrylonitrile-Based Polymer Solution

It is preferred that the polyacrylonitrile-based polymer at least contains 95 mol % or more of acrylonitrile. For the purpose of improving the membrane-forming properties or promoting the flameproofing, the polyacrylonitrile-based polymer may be copolymerized with a copolymerization component in an amount in a range of not exceeding 5 mol %. The copolymerization amount is preferably 3 mol % or less, more preferably 1 mol % or less, and still more preferably 0.5 mol % or less.

For the purpose of rapidly advancing the flameproofing reaction, at least 0.1 mol % or more of a flameproofing promoting component can be copolymerized as the copolymerization component.

Specific examples of the flameproofing promoting component serving as the above-described copolymerization component include acrylic acid, methacrylic acid, itaconic acid, crotonic acid, citraconic acid, ethacrylic acid, maleic acid, mesaconic acid, acrylamide, and methacrylamide. For the purpose of preventing a decrease of a melting point Tm in moist heat from occurring, it is preferred to use a small amount of a monomer having a high flameproofing promoting effect, and a flameproofing promoting component having a carboxyl group rather than an amide group is preferably used.

In addition, it is preferred that the number of amide groups and carboxyl groups contained in the flameproofing promoting component is 2 or more. From such a viewpoint, the flameproofing promoting component serving as the copolymerization component is preferably acrylic acid, methacrylic acid, itaconic acid, crotonic acid, citraconic acid, ethacrylic acid, maleic acid, or mesaconic acid, and more preferably itaconic acid, maleic acid, or mesaconic acid. Above all, itaconic acid is most preferably used.

The polyacrylonitrile-based polymer can be obtained through a known polymerization mode such as solution polymerization, suspension polymerization, and emulsion polymerization. It is preferred to adopt solution polymerization. The solution polymerization is more preferred than other polymerization methods because it is not necessary to isolate the polyacrylonitrile-based polymer during a period of from commencement to termination of the polymerization, and up to a stage at which the resulting membrane-forming stock solution is subjected to membrane formation, and an entangled state of polyacrylonitrile-based polymer molecular chains in the solvent in a state of the polymer solution becomes uniform.

In the step of preparing the polyacrylonitrile-based polymer solution, a concentration of the polyacrylonitrile-based polymer is preferably 7 to 21% by weight, more preferably 8 to 18% by weight, and still more preferably 9 to 16% by weight.

When the polymer concentration is 7% by weight or more, a porous layer having high pressure resistance and durability can be obtained. In addition, as the polymer concentration is higher, the pressure resistance and durability of the porous layer become higher. In addition, when the concentration of the polyacrylonitrile-based polymer is 21% by weight or less, the viscosity of the membrane-forming stock solution is controlled to an appropriate range, and therefore, there is brought such an advantage that the membrane formation is easy. This polymer concentration can be regulated according to a proportion of the solvent relative to the polyacrylonitrile-based polymer.

In the polyacrylonitrile-based polymer solution, the solvent is not particularly limited so long as it is able to dissolve the polyacrylonitrile-based polymer therein. Examples of the solvent include dimethyl sulfoxide, dimethylformamide, and dimethylacetamide.

Above all, dimethyl sulfoxide is preferably used from the viewpoint of solubility. In the case of adopting solution polymerization for the polymerization of the polyacrylonitrile-based polymer, so long as the solvent used for the polymerization and the solvent used for the membrane formation are the same as each other, a step of separation and redissolution of the obtained polyacrylonitrile-based polymer is not necessary.

The above-described polyacrylonitrile-based polymer solution may contain an additive for regulating pore diameter, porosity, hydrophilicity, elastic modulus, and so on of the porous layer. Examples of an additive for regulating the pore diameter and porosity include water, alcohols, water-soluble polymers such as polyethylene glycol, polyvinylpyrrolidone, polyvinyl alcohol, and polyacrylic acid, or salts thereof, inorganic salts such as lithium chloride, sodium chloride, calcium chloride, and lithium nitrate, formaldehyde, and formamide. However, the additive is not limited thereto. Examples of an additive for regulating the hydrophilicity and elastic modulus include a variety of surfactants.

The above-described polyacrylonitrile-based polymer solution may also be a mixture of plural polyacrylonitrile-based polymer solutions having a different composition from each other. For example, in the case where a polyacrylonitrile copolymer resulting from copolymerization with a component for promoting the flameproofing is mixed with polyacrylonitrile as a single component, a porous layer in which the polyacrylonitrile copolymer having a high affinity with a non-solvent at the time of immersion in a coagulating bath is localized in the membrane surface is obtained. By flameproofing the porous layer in which the polyacrylonitrile copolymer resulting from copolymerization with a component for promoting the flameproofing is localized in the membrane surface, a porous layer in which the gradient of the degree of cyclization in the thickness direction changes continuously can be obtained.

(b) Step of Forming a Layer Having a Three-Dimensional Network Structure

The step of forming a layer having a three-dimensional network structure from the polymer solution includes a step of applying the polyacrylonitrile-based polymer onto a base material or substrate; a step of immersing the applied polyacrylonitrile-based polymer solution in a non-solvent having a lower solubility of the polyacrylonitrile-based polymer as compared with a good solvent of the above-described polymer to coagulate the polymer, thereby forming a three-dimensional network structure; and a washing step.

At the time of applying the polyacrylonitrile-based polymer solution, the polymer solution may be applied typically at a temperature ranging from 20 to 60° C. When the temperature thereof falls within this range, the polymer can be solidified without being deposited. Additionally, the preferred temperature range of the polymer solution may be properly regulated according to the viscosity of the polymer solution used or the like.

In the case where the membrane form is a flat membrane, it is preferred that the polyacrylonitrile-based polymer solution is applied onto the substrate at the time of membrane forming step. In order to control the immersion of the polymer solution into the substrate, the time after application of the polymer solution onto the substrate until immersion in the non-solvent may be controlled, or the viscosity may be regulated by controlling the temperature or concentration of the polymer solution. In addition, both the time after application until immersion in the non-solvent and the viscosity of the solution may also be regulated.

Examples of the non-solvent of the polyacrylonitrile-based polymer include water; aliphatic hydrocarbons, aromatic hydrocarbons and aliphatic alcohols, such as hexane, pentane, benzene, toluene, methanol, ethanol, trichloroethylene, ethylene glycol, diethylene glycol, triethylene glycol, propylene glycol, butylene glycol, pentanediol, hexanediol, and low-molecular weight polyethylene glycol; and mixed solvents thereof.

As the coagulating bath including a non-solvent, among the above-described non-solvents, water is typically used from the viewpoints of safety and production costs; however, the coagulating bath is not particularly limited so long as it does not dissolve the polymer therein.

In addition, a temperature of the coagulating bath is preferably −20° C. to 100° C., and more preferably 20 to 40° C. When the temperature of the coagulating bath is 100° C. or lower, a vibration of the surface of the coagulating bath to be caused due to thermal motion can be suppressed small, and therefore, a membrane having high smoothness can be obtained. In addition, when the temperature of the coagulating bath is −20° C. or higher, a coagulation rate can be increased.

Subsequently, the porous layer obtained under such a preferred condition is subjected to water washing in order to remove the membrane-forming solvent remaining in the membrane. A temperature of water at the time of washing is preferably 50 to 100° C., and more preferably 60 to 95° C. When the temperature of water is 100° C. or lower, a degree of shrinkage of the porous layer can be controlled low, and therefore, worsening of water permeability can be inhibited. In addition, when the temperature of water is 50° C. or higher, a high washing effect can be obtained, and therefore, the membrane-forming solvent can be thoroughly removed from the inside of the porous layer. As a result, deformation and collapse of fine pores in the step of heat treatment can be inhibited. In addition, the membrane may be drawn at the time of water washing.

With respect to the hollow-fiber membrane, it is preferred to perform steam drawing in such a manner that in a pressurized steam, the membrane is drawn preferably 3 times or more, more preferably 4 times or more, and still more preferably 5 times or more in terms of a length.

For the purpose of enhancing the mechanical physical properties of the obtained hollow-fiber membrane, a draw ratio over the whole of the water washing step and the steam drawing step (total draw ratio) is preferably 8 to 15 times. The total draw ratio is more preferably 10 to 14.5 times, and still more preferably 11 to 14 times.

When the total draw ratio is 8 times or more, the degree of orientation of the obtained polyacrylonitrile-based polymer for hollow-fiber membrane is appropriately regulated, and in a subsequent firing step for producing a hollow-fiber membrane, high drawing properties can be obtained. In addition, when the total draw ratio is 15 times or less, the fiber breakage during drawing can be inhibited, and the qualities of the polyacrylonitrile-based polymer for hollow-fiber membrane and the hollow-fiber membrane can be kept.

(c) Flameproofing Step

The thus-obtained porous layer is subsequently subjected to flameproofing by a heat treatment. The flameproofing means that the polyacrylonitrile-based polymer is heated to render in an infusible state against heat.

A temperature of flameproofing is 140° C. or higher, preferably 160° C. or higher, and more preferably 180° C. or higher. When the flameproofing temperature is 140° C. or higher, the flameproofing can be completed for a relatively short period of time. Namely, by performing the flameproofing treatment at 140° C. or higher, a porous layer having high durability can be obtained for a relatively short period of time. As a result, a separation membrane satisfying the properties which are required as a highly durable membrane can be obtained.

An upper limit of the flameproofing temperature is preferably a temperature of {(weight reduction starting temperature)−20° C.} or lower relative to the weight reduction starting temperature obtained by thermogravimetric measurement of a precursor to be heat treated in a flameproofing furnace. The flameproofing temperature is more preferably {(weight reduction starting temperature)−25° C.} or lower, and more preferably {(weight reduction starting temperature)−30° C.} or lower.

In the case where the flameproofing temperature is {(weight reduction starting temperature)−20° C.} or lower, the generation of voids to be caused due to generation of a large quantity of a volatile component, or the generation of a defect to be caused due to a damage of the three-dimensional network structure hardly occurs, and therefore, a porous layer having high strength can be obtained.

The above-described precursor refers to the raw material polyacrylonitrile-based polymer in the case where the flameproofing furnace is a single furnace. Meanwhile, in the case where the flameproofing furnace is constructed of plural furnaces or plural regions having a different temperature from each other, the precursor refers to a membrane obtained by peeling off the substrate from a composite material of the porous layer and the substrate on the way of flameproofing as subjected to flameproofing in the furnace or region just before it.

In the case where the interior of the furnace is divided in parallel to the traveling direction of the membrane to form steps, the regions having a different temperature from each other refer to the respective steps when the respective steps have a different temperature from each other; and in the case where heaters having a different temperature from each other are arranged in a perpendicular direction to the traveling direction of the membrane, the regions having a different temperature from each other refer to portions to be heated by the respective heaters.

When the heat treatment is performed under an oxidative gas atmosphere, it can be completed for a shorter period of time. Examples of the oxidative gas atmosphere include air; a mixed gas of nitrogen and oxygen, an oxygen concentration of which is increased to 20% or more; and an atmospheric gas having a small amount of a NOx gas added thereto. Among those, air is preferably used from the viewpoints of safety and production costs.

A time of the heat treatment can be properly chosen according to the treatment temperature, and it is preferably 1 to 500 minutes. When the heat treatment time is 1 minute or more, a difference in structure between the surface layer and the interior can be inhibited, and therefore, there is obtained such an effect that unevenness in the durability is hardly caused. In addition, when the heat treatment time is 500 minutes or less, the oxidation in the neighborhood of the surface can be appropriately inhibited, and therefore, the physical strength can be maintained.

The heat treatment time is more preferably 2 to 60 minutes, and still more preferably 5 to 15 minutes. In this way, by allowing the flameproofing to proceed for a shorter period of time than that under the conventional flameproofing condition, a porous layer having such a gradient that the degree of cyclization at one surface side is higher, and the degree of cyclization becomes lower toward the other surface side. In addition, by flameproofing the precursor of the three-dimensional network structure for a short period of time, the generation of local progress of the flameproofing to be caused due to the matter that a quantity of heat retains in the interior of the porous layer can be inhibited.

Additionally, the heat treatment time refers to a total time at which the separation membrane retains within the flameproofing furnace.

(6-2) Formation of Separation Functional Layer

The production method of a separation membrane may further include a step of forming a separation functional layer on the surface of the porous layer obtained through the above-described flameproofing.

(a) Polyamide

A specific method of forming a polyamide layer serving as the separation functional layer is described.

A polyfunctional amine aqueous solution is applied on the porous supporting membrane, and then, an excess of the amine aqueous solution is removed by an air knife or the like. A polyfunctional acid halide-containing solution is applied thereonto, and an excess of the polyfunctional acid halide is removed by an air knife or the like.

Thereafter, the monomer may also be removed by washing. In addition, a chemical treatment with chlorine, an acid, an alkali, nitrous acid, or the like may also be performed. After the chemical treatment, washing may be performed, or after washing, the chemical treatment may be performed.

An organic solvent is used as the solvent of the polyfunctional acid halide-containing solution. The organic solvent is preferably a solvent that is immiscible with water, is capable of dissolving the polyfunctional acid halide, and does not break the porous layer, and may be a solvent that is inactive with the polyfunctional amine compound and the polyfunctional acid halide. Preferred examples thereof include hydrocarbon compounds such as n-hexane, n-octane, and n-decane.

(b) Carbon Material

Although a formation method of the separation functional layer is not particularly limited, examples thereof include a chemical vapor deposition (CVD) method such as thermal CVD and plasma CVD; a physical vapor deposition (PVD) method such as vacuum deposition and sputtering; a method in which a liquid dispersion containing a carbon material is cast on the porous layer and then dried to form a coating film; and a method in which a solution containing a precursor of a carbon material is cast on the porous layer to form a coating film and then heat treated, thereby achieving carbonization. Among those, the CVD method can be suitably adopted from the viewpoint of controlling the pore diameter and thickness of the separation functional layer, and plasma CVD and Cat-CVD (catalytic chemical vapor deposition method) capable of undergoing the reaction at a low temperature are more suitably adopted.

Examples of a carbon-containing molecule that is contained in a raw material gas of the CVD method include a hydrocarbon, and a hetero atom-containing molecule.

Specifically, examples of the hydrocarbon include methane, ethane, ethylene, acetylene, propane, propylene, butane, butadiene, pentane, pentene, cyclopentadiene, hexane, cyclohexane, benzene, and toluene. These hydrocarbons may be used solely, or may be used in combination of two or more thereof.

As the hetero atom-containing molecule, a compound containing a hetero atom such as oxygen, nitrogen and boron, and having preferably 5 or less carbon atoms can be used. Specifically, examples thereof include alcohols such as methanol and ethanol, ethers such as dimethyl ether, carbon monoxide, and carbon dioxide.

It is preferred to feed the raw material gas containing such a carbon-containing molecule at a fixed pressure into a chamber having the porous layer disposed therein. At this time, an inert gas such as helium and argon, or a hydrogen gas may be fed as a carrier gas together into the chamber.

Although an atmospheric pressure (internal pressure of the chamber) on forming the separation functional layer is not limited so long as the desired carbon material can be synthesized, it is typically under a pressure of from 10 atm to a reduced pressure. Specifically, the atmospheric pressure is preferably 1 Pa or more and 1 MPa or less, and more preferably 100 Pa or more and 0.2 MPa or less.

As for the reaction temperature, a suitable temperature is determined taking into consideration the kind or concentration of the carbon-containing molecule that is contained in the raw material gas and the reaction pressure. From the standpoint of obtaining a formation rate of the separation functional layer or a good thin membrane while maintaining the structure of the porous layer, the reaction temperature is preferably 150 to 500° C., and more preferably 200 to 400° C.

As a catalyst for producing the carbon material, a metal film may be produced on the porous layer. Examples of the metal species of the metal film include transition metals and noble metals, such as Co, Ni, Fe, Cu, Pt, Pd, Ru, Au, Ir, Ti, Al, Ag, Mg, Mn, Cr and Sn. In performing the film formation of the metal film on the porous layer, a method such as sputtering can be adopted.

In the case of Cat-CVD, it is not necessary to produce the above-described metal film, but a heated catalyst may be disposed at a position far from the porous layer.

EXAMPLES

The present invention is hereunder described in more detail by reference to Examples, but it should be construed that the present invention is by no means limited by these Examples.

Various properties of the separation membranes of the Comparative Examples and Examples were determined by the following methods.

(Degree of Cyclization)

A degree of cyclization was measured by the micro-ATR method. First of all, a sample was vacuum-dried at 50° C. for 24 hours, thereby thoroughly removing the moisture. In the case of a membrane surface, infrared rays were irradiated on the membrane surface of the above-described dry sample using an Avatar 360 FT-IR spectrometer, manufactured by Nicolet Instrument, Inc. and also using, as accessories for total reflection spectroscopy, a single reflection type horizontal ATR spectrometer (OMNI-Sampler) and a germanium-made ATR crystal, both of which are manufactured by the same company, thereby obtaining a spectrum. As for measurement conditions, a resolution was set to 4 cm$^{-1}$, and the number of times of scanning was set to 256. In addition, the thus obtained spectrum was subjected to automatic baseline correction. In Table 1, the degree of cyclization (front) indicates the membrane surface at the side where water flows in, and the degree of cyclization (back) indicates the membrane surface at the side where permeate flows out. In the case where the separation membrane included a substrate, the substrate was peeled off to take out only the porous layer, and the degree of cyclization of the membrane surface was measured.

In the case of the depth direction, a retardation film was cut by GSP (gradient shaving preparation) so as to expose a cross section in the thickness direction, a viewing region was set to an area of 100 μm×100 μm, and the viewing region was moved, thereby obtaining a spectrum of a region of 5 to 10 μm from the surface at the opposite side to the membrane surface. In addition, the thus obtained spectrum was subjected to automatic baseline correction.

In this way, an absorption peak value corresponding to each of a nitrile group and a naphthyridine ring was measured, and the degree of cyclization was calculated according to the following equation (1).

$$\text{Degree of cyclization} = I_{1600}/I_{2240} \quad (1)$$

$I_{1600}$: Absorption peak value corresponding to the naphthyridine ring at 1,600 cm$^{-1}$ $I_{2240}$: Absorption peak value corresponding to the nitrile group at 2,240 cm$^{-1}$ (Average Pore Diameter)

A separation membrane was coated with a thin film of platinum-palladium, and its image of 60,000 magnifications was photographed by an electron microscope Model S-900, manufactured by Hitachi, Ltd. at an acceleration voltage of 15 kV. The image was binarized using an image analysis software (ATI-image), and the binarized image was subjected to spherical approximation, thereby determining an average fine pore diameter of the surface of the front side of the porous layer (i.e., surface at the side where water flows in, namely the surface at the opposite side to the side coming into contact with the substrate).

(Nitrogen Composition Ratio)

First of all, a porous support having a porous layer on a substrate was vacuum-dried at 50° C. for 24 hours, thereby thoroughly removing the moisture. The substrate was peeled off from the porous support to take out only the porous layer, and the porous layer was measured in a CHN mode and an O mode using a full automatic elemental analyzer 2400II, manufactured by PerkinElmer Co., Ltd. Thereafter, an elemental composition ratio of nitrogen was calculated from the amounts of respective elements obtained through the measurement.

(Solvent Resistance)

The case where a change ratio of water permeability before and after immersing a separation membrane in N,N-dimethylformamide for one night was less than 10% was judged that the solvent resistance is good, whereas the case where the change ratio of water permeability was 10% or more was judged that the solvent resistance is poor.

The water permeability (m$^3$/m$^2$/h) was calculated in the following manner. That is, distilled water was fed into the separation membrane under conditions at an operation pressure of 100 kPa and a temperature of 25° C., and after lapsing 10 minutes, an amount of permeate per 2 minutes was measured. From the measurement results, the water permeability was calculated in terms of water permeability (m$^3$) per membrane area (m$^2$) and one hour.

The water permeability before and after immersion in N,N-dimethylformamide was measured, and a proportion of an absolute value of its difference to the water permeability before immersion in N,N-dimethylformamide was calculated in terms of a change ratio of water permeability.

(Handleability)

Water permeabilities F1 and F2 were each measured before and after winding a separation membrane around a circular cylinder having a radius of 30 mm so as to go around the side face of the circular cylinder and allowing it to follow the circular cylinder, and its change ratio R was calculated according to an equation: R (%)={|F2−F1|/F1}×100. The case where the change ratio R was less than 10% was judged that the handleability is good, whereas the case where the change ratio R was 10% or more was judged that the handleability is poor.

The measurement conditions of the water permeabilities F1 and F2 (m$^3$/m$^2$/h) are the same as the conditions at the time of evaluating the solvent resistance. That is, distilled water was fed into the separation membrane under conditions at an operation pressure of 100 kPa and a temperature of 25° C., and after lapsing 10 minutes, an amount of permeate per 2 minutes was measured. From the measurement results, the water permeability was calculated in terms of water permeability (m$^3$) per membrane area (m$^2$) and one hour.

Comparative Example 1

An acrylonitrile monomer was polymerized using dimethyl sulfoxide as a solvent and 2,2'-azobisisobutyronitrile as a polymerization initiator under a nitrogen atmosphere by the solution polymerization method, thereby obtaining a polyacrylonitrile polymer solution.

15.0% of the polyacrylonitrile polymer solution was cast on a nonwoven fabric made of polyethylene terephthalate fibers (thickness: about 90 μm, air permeability: 1.3 cc/cm$^2$/sec) at 40° C., and immediately thereafter, the resultant was immersed in pure water at 40° C. for 5 minutes, thereby obtaining a composite material having a substrate and a 60 μm-thick porous layer formed on the substrate.

This composite material was immersed in hot water at 95° C. for 2 minutes to wash out the dimethyl sulfoxide, thereby obtaining a separation membrane.

Example 1

The separation membrane obtained in Comparative Example 1 was fixed, dried in an oven at 50° C. for 24 hours, and then heat-treated under an air atmosphere in a flameproofing furnace at 230° C. for 2 hours, thereby obtaining a flameproofed separation membrane.

Example 2

The separation membrane obtained in Comparative Example 1 was fixed and dried in an oven at 50° C. for 24 hours, and thereafter, the side of the separation membrane surface was brought into contact with a hot plate at 250° C. under an air atmosphere for 20 minutes, thereby obtaining a flameproofed separation membrane.

Comparative Example 2

Molar ratios of an acrylonitrile monomer and acrylic acid were regulated to 99 mol % and 1 mol %, respectively, and they were polymerized using dimethyl sulfoxide as a solvent and 2,2'-azobisisobutyronitrile as a polymerization initiator under a nitrogen atmosphere by the solution polymerization method, thereby obtaining a polyacrylonitrile-acrylic acid copolymer solution.

15.0% of the polyacrylonitrile-acrylic acid copolymer solution was cast on a nonwoven fabric made of polyethylene terephthalate fibers (thickness: about 90 μm, air permeability: 1.3 cc/cm$^2$/sec) at 40° C., and immediately thereafter, the resultant was immersed in pure water at 40° C. for 5 minutes, thereby obtaining a porous layer having a thickness of 60 μm.

This separation membrane was immersed in hot water at 95° C. for 2 minutes to wash out the dimethyl sulfoxide, thereby obtaining a separation membrane.

Example 3

The separation membrane obtained in Comparative Example 2 was fixed, dried in an oven at 50° C. for 24 hours, and then heat-treated under an air atmosphere in a flameproofing furnace at 200° C. for 2 hours, thereby obtaining a flameproofed separation membrane.

Comparative Example 3

The polyacrylonitrile-acrylic acid copolymer solution of Comparative Example 2 and the polyacrylonitrile polymer solution of Comparative Example 1 were mixed to prepare a mixed solution containing the both polymers in a weight ratio of 1/1.

15.0% of the mixed solution was cast on a nonwoven fabric made of polyethylene terephthalate fibers (thickness: about 90 μm, air permeability: 1.3 cc/cm$^2$/sec) at 40° C., and immediately thereafter, the resultant was immersed in pure water at 40° C. for 5 minutes, thereby obtaining a porous layer having a thickness of 60 μm.

This separation membrane was immersed in hot water at 95° C. for 2 minutes to wash out the dimethyl sulfoxide, thereby obtaining a separation membrane.

Example 4

The separation membrane obtained in Comparative Example 3 was fixed, dried in an oven at 50° C. for 24 hours, and then heat-treated under an air atmosphere in a flameproofing furnace at 230° C. for 2 hours, thereby obtaining a flameproofed separation membrane. Although both Example 3 and Example 4 were good according to the handleability of the present invention, Example 4 was more excellent in terms of adhesiveness to the substrate (exfoliation resistance).

Comparative Example 4

A separation membrane was obtained in the same manner as in Comparative Example 3, except that in Comparative Example 3, a nonwoven fabric made of polyphenylene sulfide (thickness: about 119 μm, air permeability: 4.0 cc/cm$^2$/sec) was used as the substrate.

Example 5

The separation membrane obtained in Comparative Example 4 was fixed, dried in an oven at 50° C. for 24 hours, and then heat-treated under an air atmosphere in a flameproofing furnace at 230° C. for 2 hours, thereby obtaining a flameproofed separation membrane. Although both Example 3 and Example 4 were good according to the handleability of the present invention, Example 5 was more excellent in terms of adhesiveness to the substrate (exfoliation resistance).

Example 6

The separation membrane obtained in Example 5 was immersed in an m-phenylenediamine aqueous solution, an excess of the aqueous solution was dropped by means of liquid draining, and a decane solution of trimesic acid chloride was applied onto the surface at the side of the porous layer, thereby forming a polyamide separation functional layer. Subsequently, the resultant was washed with water at 90° C. for 2 minutes, thereby obtaining a composite separation membrane having a separation functional layer. Incidentally, in Table 1, as the degree of cyclization and the average pore diameter in Example 6, the same values as the degree of cyclization and the average pore diameter measured regarding the porous layer of Example 5 are described.

Example 7

The separation member obtained in Example 5 was placed within a chamber of a plasma CVD apparatus and subjected to vapor deposition at 250° C. using acetylene as a raw material gas and hydrogen as a carrier gas, thereby forming a separation functional layer having a nitrogen constitutional ratio of 16.7%. Incidentally, in Table 1, as the degree of cyclization and the average pore diameter in Example 7, the same values as the degree of cyclization and the average pore diameter measured regarding the porous layer of Example 5 are described.

Comparative Example 5

A separation membrane was obtained in the same manner as in Comparative Example 3, except that in Comparative Example 3, a nonwoven fabric made of carbon fibers (thickness: about 125 μm, air permeability: 3.5 cc/cm$^2$/sec) was used as the substrate.

Example 8

The separation membrane obtained in Comparative Example 5 was fixed, dried in an oven at 50° C. for 24 hours, and then heat-treated under an air atmosphere in a flameproofing furnace at 230° C. for 2 hours, thereby obtaining a flameproofed separation membrane.

Example 9

The separation member obtained in Example 8 was placed within a chamber of a plasma CVD apparatus and subjected to vapor deposition at 250° C. using acetylene as a raw material gas and hydrogen as a carrier gas, thereby forming a separation functional layer having a nitrogen constitutional ratio of 14.2%. Incidentally, in Table 1, as the degree of cyclization and the average pore diameter in Example 9, the same values as the degree of cyclization and the average pore diameter measured regarding the porous layer of Example 8 are described.

Comparative Example 6

The separation membrane obtained in Comparative Example 5 was fixed, dried in an oven at 50° C. for 24 hours, and then heat-treated under an air atmosphere in a flameproofing furnace at 250° C. for 2 hours, followed by performing a pre-carbonization treatment under a nitrogen atmosphere in a carbonization furnace at 900° C. for 2 hours (degree of cyclization: >100, nitrogen constitutional ratio: 11.5%). The obtained separation membrane was placed within a chamber of a plasma CVD apparatus and subjected to vapor deposition at 250° C. using acetylene as a raw material gas and hydrogen as a carrier gas, thereby forming a composite separation membrane having a separation functional layer.

Comparative Example 7

A separation membrane was obtained in the same manner as in Comparative Example 3, except that in Comparative Example 3, a glass substrate was used in place of the nonwoven fabric. The obtained separation membrane was fixed, dried in an oven at 50° C. for 24 hours, and then heat-treated under an air atmosphere in a flameproofing furnace at 230° C. for 2 hours, thereby obtaining a flameproofed separation membrane.

Comparative Example 8

A composite semipermeable membrane was obtained in the same manner as in Comparative Example 1, except that in Comparative Example 1, 15.0% of a polysulfone polymer solution having a molecular weight of 50,000 was cast at 40° C. in place of the polyacrylonitrile polymer solution. The separation membrane was fixed, dried in an oven at 50° C. for 24 hours, and then heat-treated under an air atmosphere in a flameproofing furnace at 230° C. for 2 hours, thereby obtaining a flameproofed separation membrane.

The foregoing results are shown in Table 1. It is noted from these results that in accordance with the present invention, a separation membrane with excellent solvent resistance, which is endurable against a high temperature and a high pressure and also applicable to an organic solvent, is obtainable.

TABLE 1

|  | Degree of cyclization (front) (-) | Degree of cyclization (back) (-) | Ratio of degree of cyclization (front/back) (-) | Average pore diameter (μm) | Solvent resistance (-) | Handleability |
|---|---|---|---|---|---|---|
| Example 1 | 1.1 | 1.0 | 1.1 | 0.089 | Good | Good |
| Example 2 | 0.8 | 0.6 | 1.3 | 0.074 | Good | Good |
| Example 3 | 1.8 | 1.6 | 1.1 | 0.042 | Good | Good |
| Example 4 | 2.6 | 1.7 | 1.5 | 0.124 | Good | Good |
| Example 5 | 2.8 | 1.8 | 1.6 | 0.115 | Good | Good |
| Example 6 | 2.8 | 1.8 | 1.6 | 0.115 | Good | Good |
| Example 7 | 2.8 | 1.8 | 1.6 | 0.115 | Good | Good |
| Example 8 | 2.8 | 1.6 | 1.8 | 0.119 | Good | Good |
| Example 9 | 2.8 | 1.6 | 1.8 | 0.119 | Good | Good |
| Comparative Example 1 | 0.2 | 0.2 | 1.0 | 0.022 | Poor | Good |
| Comparative Example 2 | 0.2 | 0.2 | 1.0 | 0.018 | Poor | Good |
| Comparative Example 3 | 0.2 | 0.2 | 1.0 | 0.076 | Poor | Good |
| Comparative Example 4 | 0.2 | 0.2 | 1.0 | 0.034 | Poor | Good |
| Comparative Example 5 | 0.2 | 0.2 | 1.0 | 0.086 | Poor | Good |
| Comparative Example 6 | >100 | >100 | 1.0 | 2.1 | Good | Poor |
| Comparative Example 7 | 1.6 | 1.6 | 1.0 | <0.005 | Good | Poor |
| Comparative Example 8 | – | – | – | 0.025 | Poor | Good |

The solvent-resistant separation membrane of the present invention can be suitably used for selective separation of a liquid mixture containing an organic solvent.

While the invention has been described in detail and with reference to specific embodiments thereof, it will be apparent to one skilled in the art that various changes and modifications can be made therein without departing from the intent and scope thereof. It is to be noted that the present application is based on a Japanese patent application filed on Aug. 8, 2014 (Japanese Patent Application No. 2014-162142) and a Japanese patent application filed on Aug. 29, 2014 (Japanese Patent Application No. 2014-175395), and the contents are incorporated herein by reference.

The invention claimed is:

1. A solvent-resistant separation membrane comprising a substrate, a porous layer, and a separation functional layer on the porous layer,
wherein the substrate, the porous layer and the separation functional layer are superimposed in this order,
wherein the porous layer contains, as a main component thereof, a flameproofed polymer that is a polyacrylonitrile-based polymer having been subjected to a flameproofinq treatment by heat treatment,
wherein an average pore diameter of at least one surface of the porous layer is 0.005 to 1 μm and is measured by averaging pore diameter values obtained with a scanning electron microscope, and
the porous layer includes a portion where a degree of cyclization as measured by a total reflection infrared absorption spectroscopy is 0.5 to 50, wherein the degree of cyclization is a ratio of an absorption peak value at 1,600 cm$^{-1}$ and an absorption peak value at 2,240 cm$^{-1}$ ($I_{1600}/I_{2240}$).

2. The solvent-resistant separation membrane according to claim 1, wherein in the porous layer, the degree of cyclization is different at two arbitrary points in a thickness direction of the porous layer.

3. The solvent-resistant separation membrane according to claim 2, wherein the degree of cyclization in the thickness direction is such that the degree of cyclization of one surface of the porous layer is higher, and the degree of cyclization becomes lower toward the other surface thereof.

4. The solvent-resistant separation membrane according to claim 2, wherein the degree of cyclization is higher on both surfaces of the porous layer and becomes lower toward a central part thereof.

5. The solvent-resistant separation membrane according to claim 1, wherein a ratio of the degree of cyclization of one surface of the porous layer to the other surface thereof is 1.1 or more.

6. The solvent-resistant separation membrane according to claim 1, wherein the substrate contains polyphenylene sulfide.

* * * * *